(12) United States Patent
Arakaki et al.

(10) Patent No.: US 7,516,887 B2
(45) Date of Patent: Apr. 14, 2009

(54) SURFACE MOUNTABLE MULTIFORMAT READER FOR VENDING MACHINE APPLICATION

(75) Inventors: James S. Arakaki, Campbell, CA (US); Stanley A. Mercado, Santa Clara, CA (US)

(73) Assignee: Vivotech, Inc., Santa Clara, CA (US)

( * ) Notice: Subject to any disclaimer, the term of this patent is extended or adjusted under 35 U.S.C. 154(b) by 0 days.

(21) Appl. No.: 11/807,928

(22) Filed: May 30, 2007

(65) Prior Publication Data

US 2008/0236991 A1 Oct. 2, 2008

Related U.S. Application Data

(60) Provisional application No. 60/921,046, filed on Mar. 30, 2007.

(51) Int. Cl.
*G06F 7/08* (2006.01)
*G06F 17/00* (2006.01)
(52) U.S. Cl. ........................ 235/381; 235/380
(58) Field of Classification Search ......... 235/379–381, 235/439–441, 449
See application file for complete search history.

(56) References Cited

U.S. PATENT DOCUMENTS

| 5,397,886 A | * | 3/1995 | Mos et al. ............. 235/475 |
| 6,176,426 B1 | * | 1/2001 | Kanayama et al. ......... 235/449 |
| 7,004,385 B1 | * | 2/2006 | Douglass ............... 235/379 |

* cited by examiner

*Primary Examiner*—Thien M. Le
*Assistant Examiner*—April A Taylor
(74) *Attorney, Agent, or Firm*—Jenkins, Wilson, Taylor & Hunt, P.A.

(57) ABSTRACT

A surface mountable multiformat card reader for vending equipment is disclosed. According to one aspect, the subject matter described herein includes a surface mountable card reader that comprises a mounting bracket for attaching to a vending machine. The surface mountable card reader also includes a card reader housing that extends outward from the mounting bracket. The housing, which includes a channel spaced outwardly from the mounting bracket for receiving a magnetic stripe card, comprises a radio frequency (RF) proximity reader that is adapted for receiving data via an RF signal from a contactless card. The housing also comprises a magnetic stripe reader that is adapted for receiving data from magnetic stripe cards that pass through the channel.

15 Claims, 2 Drawing Sheets

SURFACE MOUNTABLE MULTIFORMAT READER FOR VENDING MACHINE APPLICATION

RELATED APPLICATIONS

The presently disclosed subject matter claims the benefit of U.S. Provisional Patent Application Ser. No. 60/921,046, filed Mar. 30, 2007; the disclosure of which is incorporated herein by reference in its entirety.

TECHNICAL FIELD

The subject matter described herein relates to a card reader that facilitates various forms of payment media transactions used at vending equipment. More particularly, the subject matter described herein relates to a surface mountable multi-format card reader for vending equipment.

BACKGROUND

Installation of various payment media readers in vending equipment is limited by the available front panel space and internal clearances. The vending machine industry provides various cutouts in a vending machine's front panel for various types of currency acceptors or payment card (e.g., credit card, debit card, etc.) acceptors. Consequently, there is typically only enough space to accommodate a bill acceptor or an insertion type card reader. Specifically, the physical form and dimensions of a conventional bill acceptor prevents the installation of an insertion type card reader since the bill acceptor requires internal clearances for the currency stacking mechanism. Thus, a vending machine operator is usually required to choose between a currency acceptor and an insertion type card reader. However, since space is more often limited by internal clearances as opposed to the space on the vending machine's front panel, implementation of alternative payment mechanisms and readers may be possible.

One type of reader that it may be desirable to implement on a vending machine is a radio frequency (RF) proximity reader for reading contactless cards brought in proximity to the reader. It may also be desirable to allow users to use both contactless cards and conventional magnetic stripe cards to purchase goods from vending machines. However, current insertion-type card readers do not read contactless RF cards and their internal circuitry and footprint on the front panel of a vending machine limits the ability to add RF card readers.

Accordingly, there exists a need for providing the capability to read magnetic and contactless RF cards in a vending machine.

SUMMARY

According to one aspect, the subject matter described herein includes a surface mountable multiformat card reader for a vending machine application. The subject matter described herein includes a surface mountable card reader that comprises a mounting bracket for attaching to a vending machine. The surface mountable card reader also includes a card reader housing that extends outward from the mounting bracket. The housing, which includes a channel spaced outwardly from the mounting bracket for receiving a magnetic stripe card, comprises a radio frequency (RF) proximity reader that is adapted for receiving data via an RF signal from a contactless card. The housing also comprises a magnetic stripe reader that is adapted for receiving data from magnetic stripe cards that pass through the channel.

BRIEF DESCRIPTION OF THE DRAWINGS

Preferred embodiments of the subject matter described herein will now be explained with reference to the accompanying drawings of which.

DETAILED DESCRIPTION OF THE INVENTION

In accordance with the subject matter disclosed herein, a surface mountable multi-format card reader (SMCR) is provided. The SMCR may be adapted to accept a plurality of different payment types, such as a credit card, a debit card, a contactless smart card, and the like. In one embodiment, the SMCR may be mounted to a vending machine or any other like unattended device that may benefit from the capability of receiving various forms of payment from a customer in convenient manner.

Figure 1:
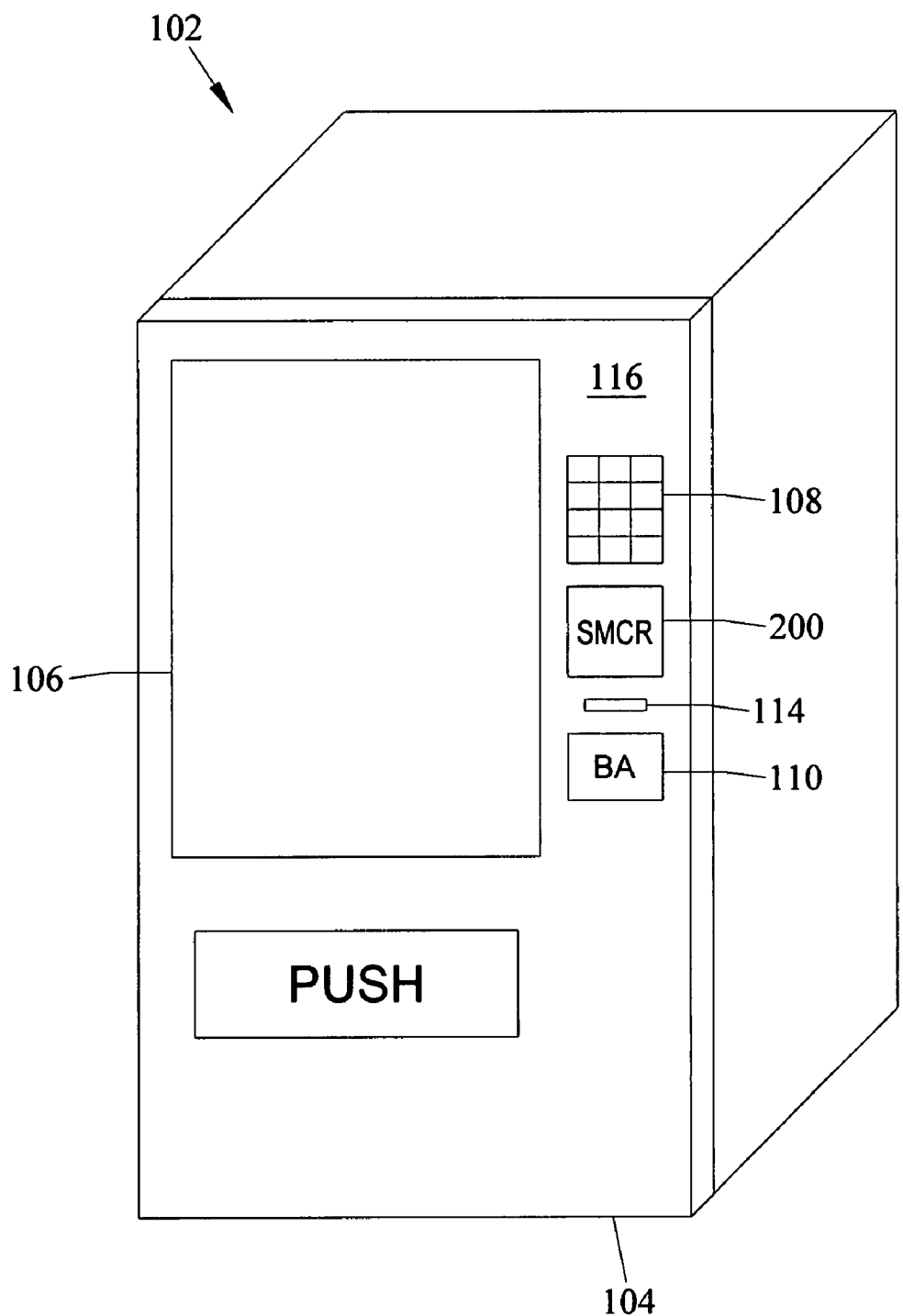
FIG. 1 is a block diagram that depicts an exemplary vending machine employing a multi-format surface mountable card reader according to an embodiment of the subject matter described herein.

FIG. 1 is a block diagram illustrating an exemplary vending machine 102 according to an embodiment of the subject matter herein. Although only one type of vending machine is depicted in FIG. 1, those skilled in the art realize that a vending machine may exist in various shapes and sizes. Referring to FIG. 1, vending machine 102 comprises a front panel 104 that includes a protective viewing panel 106, a selection keypad 108, a coin acceptor 114, a bill acceptor 110, and a surface mountable card reader 200. Front panel 104 may include a mounting surface 116 on which surface mountable card reader 200 may be mounted. Protective viewing panel 106 may be made of plexiglass or any other similar durable panel that allows a customer to view the products contained in a vending machine. However, some vending machines do not include a viewing panel. Selection keypad 108 may include any mechanism (e.g., a grouping of buttons) that enables a customer to select a product from vending machine 102. A coin acceptor 114 may include any mechanism for receiving deposited coins. Similarly, a bill acceptor 110 may comprise any mechanism for receiving deposited bills.

In order to receive goods from a vending machine or like device, payment must be rendered to and accepted by the vending machine. By increasing the number of methods by which a vending machine may accept payment, the vending machine will then be more readily accessible to a larger group of potential customers. Similarly, by being accessible to a larger number of potential buyers, the greater the opportunity a vending machine will have to sell its contained goods.

Typically, a user renders payment to a vending machine either by supplying the machine with currency using coin acceptor 114 or bill acceptor 110. These mechanisms for receiving payment may limit the number of potential customers that can use the vending machine since a customer must have the requisite monies on his/her person.

Consequently, one aspect of the present subject matter enables customers to conduct various purchase transactions at vending equipment using a credit card, a debit card, a contactless smart card, or the like. In addition to avoiding problems relating to convenience and safety (e.g., carrying money on a customer's person), these payment methods do not require a vending machine to store or return change to the customer after a purchase, thus allowing for a prompt and more convenient sale transaction. Therefore, surface mountable card reader 200 is designed to afford vending machines additional number of payment alternatives without compromising the previously existing payment options.

Surface mountable card reader (SMCR) 200 may include any device that is adapted to be mounted to a vending machine. Notably, SMCR 200 may be configured to process a payment from a payment card or a contactless smart card. A payment card may comprise any magnetic stripe card that contains account information on the magnetic stripe and may be accessed through a magnetic stripe card reader. In one embodiment, a payment card may include a credit card or a debit card.

Conversely, a contactless smart card (e.g., MasterCard PayPass® card) does not rely on a magnetic stripe (although in some embodiments, the smart card may still include a magnetic stripe to be used with non-RF equipped readers), but instead may include an embedded chip (e.g., a secure microcontroller or like device), internal memory, and a small antenna. Contactless smart card technology is used in applications that require the protection of personal information as well as delivering fast, secure transactions (e.g., transit fare payment cards, vending machine purchases, etc.). Contactless smart cards have the ability to securely manage, store and provide access to data on the card, perform on-card functions (e.g., encryption) and interact intelligently with a contactless smart card reader. Contactless smart card technology is available in a variety of forms, such as plastic cards, key fobs, and other handheld devices (e.g., built into mobile phones). The chip in the contactless card contains the same information held by the conventional magnetic stripe of a credit card or debit card.

In order to facilitate the acceptance of magnetic stripe cards and contactless cards, SMCR 200 is equipped with both a magnetic stripe card reader and an RF proximity card reader. Consequently, SMCR 200 may include both a magnetic stripe card reader unit and a radio frequency (RF) proximity reader in order to process a payment from a credit card, debit card, contactless smart card, and the like.

Figure 2:
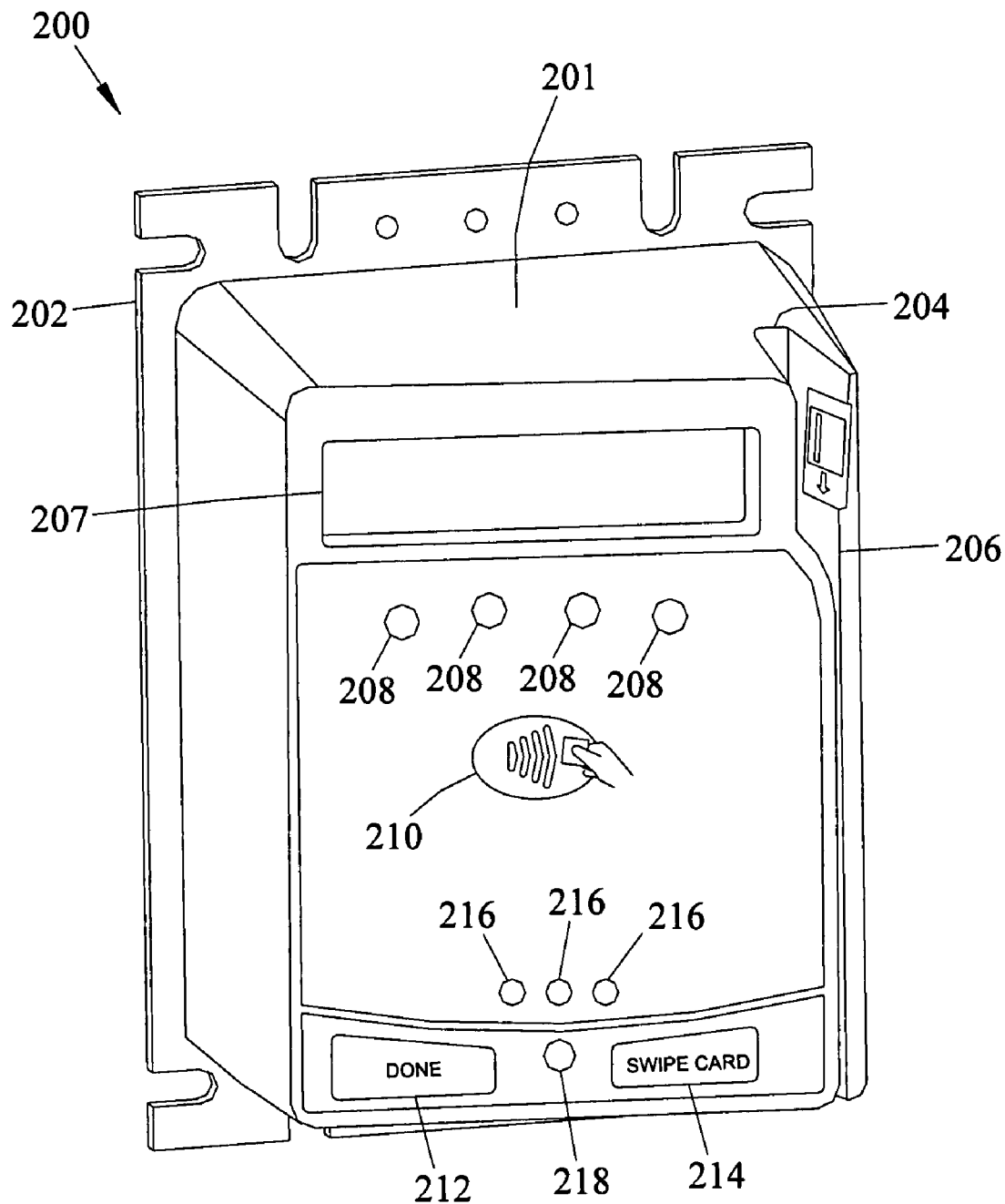
FIG. 2 is a block diagram that depicts a multi-format surface mountable card reader according to an embodiment of the subject matter described herein.

FIG. 2 illustrates an exemplary surface mountable card reader 200, which comprises a mounting bracket 202 and a card reader housing 201. In one embodiment, card reader housing 201 outwardly extends or protrudes from mounting bracket 202 to allow a user to easily swipe a magnetic stripe card through a channel 206 formed by housing 201. The card reader housing 201 may be characterized as including a rectangular box shaped unit or enclosure that includes both a magnetic stripe swipe reader 204 and an RF proximity reader 210. In one embodiment, housing 201 is enclosed in such a manner that the internal circuitry is completely sealed and protected from the weather and elements. The shape of the housing 201 permits sufficient internal clearance for the inclusion of an RF proximity reader antenna and its required circuitry. In one embodiment, an RF proximity reader 210 is positioned on the surface face of housing 201 along with a display 207, a first set of indicators 208, a second set of indictors 216, and a single indicator 218. Display 207 may include a liquid crystal display (LCD) or any other like display screen. In one embodiment, the first set of indicators 208 are green light emitting diodes (LEDs) that blink to indicate that a credit card, debit card, contactless smart card, or the like, has been read (i.e., payment has been proffered). Similarly, the second set of indicators 216 may include blue LEDs that blink sequentially to indicate that SMCR 200 is activated and ready to process a transaction. Single indicator 218 may be an orange LED that blinks to indicate that a transaction is in progress. Single indicator 218 may also include a beep sound that accompanies the blinking LED.

RF proximity reader 210 is adapted to read contactless smart cards and deduct the appropriate funds from an electronic account. To use a contactless card with RF proximity card reader 210, the user simply holds the card near an RF proximity reader 210 at vending machine 102. The chip inside the card is activated by radio waves from card reader 210. The contactless smart card can communicate with RF proximity reader, which functions as a contactless radio frequency (RF) interface, over short distances. Namely, RF proximity card reader 210 uses a very weak signal so the contactless card should be held approximately an inch away in order for card reader 210 to function properly. Moments after this, the carder reader 210 emits a tone and a visual indicator (e.g., indicators 208) lights up to signal payment confirmation. All other aspects of the transaction are conducted in a similar manner to the handling of traditional credit card transactions.

Along with including RF proximity card reader 210, the design of housing 201 also includes magnetic stripe swipe reader 204. Magnetic stripe swipe reader 204 may be located within housing 201 adjacent to channel 206 to magnetically read magnetic stripe cards that pass through channel 206. Channel 206 may be oriented horizontally or vertically when reader 200 is attached to a vending machine. Channel 206 may be spaced sufficiently from mounting surface of vending machine 102 when reader 200 is attached to mounting surface 116 to allow sufficient clearance for a user to access channel 106 to swipe a magnetic stripe card. The tapered (i.e., slightly angled) enclosure design of housing 201 also provides better presentation of the RF proximity card reader's front panel face to a user standing in front of the display front 106 or the product dispensing portion of the typical vending machine. This design is favorable to a more mechanically complex insertion type reader, which is commonly used in vending machines and has a greater chance of malfunction. In an alternate embodiment, channel 206 may be orientated in a horizontal manner (e.g., positioned over the display 207) instead.

The design of SMCR 200 similarly does not require that housing 201 occupy the same space that contains the bill acceptor 110. Traditionally, vending machines have a standard panel cutout that is typically designed for a bill acceptor 110. Due to the internal clearances required for the currency stack mechanism and circuitry, there is typically not enough interior space available for adding an insertion type magnetic stripe card reader. To avoid this dilemma, SMCR 200 is adapted for attachment to the exterior of vending machine 102 using a mounting bracket 202. In one embodiment, mounting bracket 202 may include a plurality of apertures or slots (see FIG. 2) that facilitate the attachment of SMCR 200 to the vending machine panel face 104 using screws, bolts, or any suitable fastener.

SMCR 200 may be attached to a vending machine in any number of ways. In one embodiment, attachment may require only simple drilled holes to permit entry of interconnecting cables and for mounting hardware. Namely, four mounting holes and a cable-routing hole must be drilled into the vending machine front panel 104. For example, a $5/8^{th}$ (15.875 mm) drill bit and a $5/32^{nd}$ (4 mm) drill bit may be used to drill the cable-routing hole and the four mounting holes, respectively. A pigtail cable may then be extended from the inside of the vending machine through the cable routing hole and attached to the back of SMCR 200. The other end of the pigtail cable is ultimately attached to an interior cable, which in turn is attached to the other circuitry in the vending machine 102.

This connection enables SMCR 200 to communicate with the vending machine and its supporting circuitry.

After pulling the slack of the pigtail cable back inside the vending machine, SMCR 200 is positioned appropriately and secured to the panel front 104 using screws or any like fastener. In addition, a bezel may be placed over the front of SMCR 200 in such a manner where the bezel snaps into place and completely covers and protects the fasteners in mounting surface 202. Once the bezel is secured in place, e.g., using locking tabs, the bezel and SMCR 200 cannot be easily removed.

Alternatively, SMCR 200 may be mounted internally. In one embodiment, SMCR 200 may be installed in the cutout or the place of an insertion type card reader. After removing the insertion type card reader, SMCR 200 may then be attached (e.g., using bolts and/or nuts to attach mounting surface 202 to the back side of front panel 104. Afterwards, SMCR 200 may be connected to the other circuitry of the vending machine using a pigtail cable and interior cable, as described above.

It will be understood that various details of the subject matter described herein may be changed without departing from the scope of the subject matter described herein. Furthermore, the foregoing description is for the purpose of illustration only, and not for the purpose of limitation.

What is claimed is:

1. A surface mountable card reader, comprising:
    a mounting bracket for attaching to a vending machine;
    a card reader housing that extends outward from the mounting bracket, the housing including a card swipe channel formed by at least one wall extending outwardly from the mounting bracket for guiding a magnetic stripe card manually swiped through the card swipe channel;
    a radio frequency (RF) proximity reader located in the housing and adapted for receiving data via an RF signal from a contactless card; and
    a magnetic stripe reader located in the housing and adapted for receiving data from magnetic stripe cards swiped through the card swipe channel.

2. The surface mountable card reader of claim 1, wherein the card reader housing is sealed in a weatherproof fashion.

3. The surface mountable card reader of claim 1, wherein the mounting bracket comprises at least one aperture that facilitates the attachment of the surface mountable card reader to the vending machine.

4. The surface mountable card reader of claim 1, wherein the data comprises account data.

5. The surface mountable card reader of claim 1, wherein the card swipe channel is configured to be oriented vertically when the card reader housing is attached to the vending machine.

6. The surface mountable card reader of claim 1, wherein the card swipe channel is configured to be oriented horizontally when the card reader housing is attached to the vending machine.

7. The surface mountable card reader of claim 1, wherein the magnetic stripe reader is adapted to read at least one credit card and debit card.

8. A vending machine for vending a product and for receiving payment from radio frequency (RF) and magnetic stripe cards, the vending machine comprising:
    a card reader mounting surface for supporting a card reader;
    a mounting bracket for attaching the card reader to the mounting surface;
    a card reader housing that extends outward from the mounting bracket, the housing including a card swipe channel formed by at least one wall extending outwardly from the mounting bracket for guiding a magnetic stripe card manually swiped through the card swipe channel;
    a radio frequency (RF) proximity reader located in the housing and adapted for receiving data via an RF signal from a contactless card; and
    a magnetic stripe reader located in the housing and adapted for receiving data from magnetic stripe cards swiped through the card swipe channel.

9. The vending machine of claim 8, wherein the card reader housing is sealed in a weatherproof fashion.

10. The vending machine of claim 8, wherein the mounting bracket comprises at least one aperture that facilitates the attachment of the surface mountable card reader to the vending machine.

11. The vending machine of claim 8, wherein the data comprises account data.

12. The vending machine of claim 8, wherein the card swipe channel is configured to be oriented vertically when the card reader housing is attached to the vending machine.

13. The vending machine of claim 8, wherein the card swipe channel is configured to be oriented horizontally when the card reader housing is attached to the vending machine.

14. The vending machine of claim 8, wherein a magnetic stripe reader is adapted to read at least one credit card and debit card.

15. The vending machine of claim 8, wherein the mounting bracket is sized to fit within a cutout in the mounting surface reserved for one of an insertion-type card reader and a bill acceptor.

\* \* \* \* \*